United States Patent
Ford

(10) Patent No.: US 11,833,912 B2
(45) Date of Patent: Dec. 5, 2023

(54) TRACTION CONTROL SYSTEM

(71) Applicant: Protean Electric Limited, Surrey (GB)

(72) Inventor: Richard Ford, Surrey (GB)

(73) Assignee: Protean Electric Limited, Farnham (GB)

( * ) Notice: Subject to any disclaimer, the term of this patent is extended or adjusted under 35 U.S.C. 154(b) by 211 days.

(21) Appl. No.: 17/284,495

(22) PCT Filed: Oct. 11, 2019

(86) PCT No.: PCT/IB2019/058686
§ 371 (c)(1),
(2) Date: Apr. 12, 2021

(87) PCT Pub. No.: WO2020/075129
PCT Pub. Date: Apr. 16, 2020

(65) Prior Publication Data
US 2021/0370779 A1 Dec. 2, 2021

(30) Foreign Application Priority Data
Oct. 11, 2018 (GB) ...................................... 1816595

(51) Int. Cl.
*B60L 3/10* (2006.01)
*H02K 11/33* (2016.01)
(Continued)

(52) U.S. Cl.
CPC ............ *B60L 3/102* (2013.01); *B60K 7/0007* (2013.01); *B60L 3/106* (2013.01); *B60L 15/08* (2013.01);
(Continued)

(58) Field of Classification Search
None
See application file for complete search history.

(56) References Cited

U.S. PATENT DOCUMENTS 8,200,408 B2 * 6/2012 Turski ............ B60W 30/18145
701/87
8,718,897 B2 * 5/2014 Wright .................. B60L 15/32
701/91
(Continued)

FOREIGN PATENT DOCUMENTS

GB 2546874 8/2017
GB 2554889 4/2018

OTHER PUBLICATIONS

PCT International Searching Authority, PCT International Search Report dated May 12, 2019, entire document.

*Primary Examiner* — Todd Melton
(74) *Attorney, Agent, or Firm* — Allen, Dyer, Doppelt & Gilchrist, P.A.

(57) ABSTRACT

A traction control system for a vehicle having a first wheel driven by a first electric motor including a first set of coil windings, the system comprising a first controller arranged to control current in the coil windings for generating a drive torque for driving the first wheel, and a second controller arranged to determine a maximum wheel velocity based on a first slip ratio value for the first wheel and the vehicle velocity and a minimum wheel velocity based on a second slip ratio value for the first wheel and the vehicle velocity. The second controller communicates to the first controller the maximum and minimum values and a torque demand value corresponding to a drive torque for driving the first wheel. The first controller controls current in the coil windings to generate a drive torque based on the maximum and minimum wheel velocity and torque demand values from the second controller.

12 Claims, 4 Drawing Sheets

(51) Int. Cl.
*H02K 11/38* (2016.01)
*B60K 7/00* (2006.01)
*B60L 15/08* (2006.01)
*H02K 11/215* (2016.01)

(52) U.S. Cl.
CPC ............ *H02K 11/33* (2016.01); *H02K 11/38* (2016.01); *B60L 2220/46* (2013.01); *B60L 2240/12* (2013.01); *B60L 2240/423* (2013.01); *B60L 2240/429* (2013.01); *B60L 2240/461* (2013.01); *B60L 2240/463* (2013.01); *B60L 2240/465* (2013.01); *B60L 2250/26* (2013.01); *H02K 11/215* (2016.01)

(56) References Cited

U.S. PATENT DOCUMENTS

| | | | |
|---|---|---|---|
| 8,751,131 B2* | 6/2014 | Reynolds | B60T 8/17616 |
| | | | 701/84 |
| 9,469,199 B1 | 10/2016 | Gauthier | |
| 9,550,435 B2* | 1/2017 | Ozaki | B60L 7/26 |
| 10,843,570 B2* | 11/2020 | Greenwood | B60L 15/20 |
| 2018/0257652 A1 | 9/2018 | Mueller | |

* cited by examiner ic motors to
TRACTION CONTROL SYSTEM

CROSS-REFERENCE TO RELATED APPLICATION

This application is the § 371 National Stage of International Application Serial No. PCT/IB2019/058686, filed on Oct. 11, 2019, which claims the benefit of U.K. Patent Application No. 1816595.1, filed on Oct. 112, 2018, the contents of which applications are herein incorporated by reference in their entirety.

FIELD OF THE INVENTION

The present invention relates to a traction control system, in particular a traction control system for a vehicle having a wheel driven by an electric motor.

BACKGROUND OF THE INVENTION

Traction control systems aim to enable a vehicle to accelerate, decelerate or turn in accordance with the intention of the driver, thereby enhancing the controllability and manoeuvrability of a vehicle.

As a consequence, traction control systems are becoming ubiquitous on modern vehicles, where these systems aim to regulate the speed of each of the road wheels such that they stay within appropriate bounds compared to the vehicle speed. In modern vehicles traction control systems typically avoid excessive slipping or sliding of a vehicle wheel via a central control unit, which actuates ABS valves and engine torque delivery systems to modulate the delivered torque. Within these systems, torque actuation occurs at either the vehicle engine or centrally located ABS manifolds, where the generated torque is transferred to the wheels via a transmission/driveline and brake hydraulic lines respectively.

However, for traction control systems that perform torque actuation centrally, these systems can suffer performance limitations due to the lag between the central actuation of the torque and application of the generated torque to the road surface via a wheel of the vehicle.

In the context of an electric vehicle motor, a drive design that is becoming increasing popular is an integrated in-wheel electric motor design in which an electric motor is integrated within a wheel of a vehicle, where the use of an in wheel motors allows the torque actuation functionality to be moved outwards to the wheel itself.

However, communications between the centrally mounted traction control unit, which regulates torque demands for avoiding excessive sliding of a vehicle or spinning of the vehicles wheels, and the in wheel motors can still impose a limitation in a traction control systems performance.

It is desirable to improve this situation.

SUMMARY OF THE INVENTION

In accordance with an aspect of the present invention there is provided a traction control system according to the accompanying claims.

The present invention provides the advantage of allowing a traction control system to be separated into a slow loop component that runs on a central controller, which calculates the appropriate speed limits for each in-wheel motor, and a fast speed control loop that runs on an in wheel motor controller, where the fast speed control loop controls torque actuation generated by the in wheel electric motors to maintain speed limits within the speed limits calculated by the slow loop.

BRIEF DESCRIPTION OF THE DRAWINGS

The present invention will now be described, by way of example, with reference to the accompanying drawings, in which.

DETAILED DESCRIPTION OF PREFERRED EMBODIMENT

Figure 1:
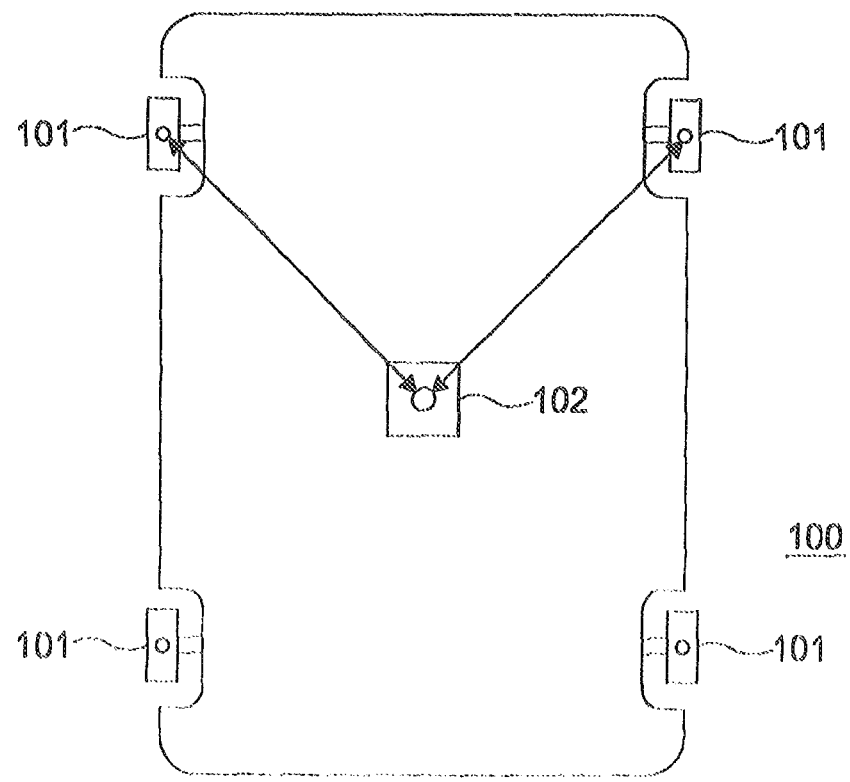
FIG. 1 illustrates a vehicle incorporating a traction control system according to an embodiment of the present invention.

FIG. 1 illustrates a vehicle 100, for example a car or lorry, having four wheels 101, where two wheels are located in the vehicles forward position in a near side and off side position respectively. Similarly, two additional wheels are located in the vehicles aft position in near side and off side positions respectively, as is typical for a conventional car configuration. However, as would be appreciated by a person skilled in the art, the vehicle may have any number of wheels.

Incorporated within the wheels 101 in the vehicle's aft position are in-wheel electric motors, as described in detail below. Although the current embodiment describes a vehicle having in-wheel electric motors associated with the wheels 101 located in the vehicle's aft position, as would be appreciated by a person skilled in the art the in-wheel electric motors can be located in other wheels. For example, in-wheel electric motors can be located in the front two wheels. Additionally, although the present embodiment describes the use of in-wheel electric motors, other electric motor configurations can be used, for example two in-board mounted electric motor, where each electric motor uses a drive shaft to drive a respective wheel.

Coupled to the in-wheel electric motors and to a vehicle communication bus, for example a CAN bus (not shown), is a control unit 102 that in conjunction with control devices mounted on each of the respective in wheel electric motors is arranged to control the torque generated by the in-wheel electric motors, as described below.

For the purpose of illustration the in-wheel electric motor is of the type having a set of coils being part of the stator for attachment to the vehicle, radially surrounded by a rotor carrying a set of magnets for attachment to a wheel. However, as would be appreciated by a person skilled in the art, the present invention is applicable to other types of electric motors. Typically, upon demand, an in-wheel electric motor will be configured to provide both drive torque and regenerative braking torque.

Figure 2:
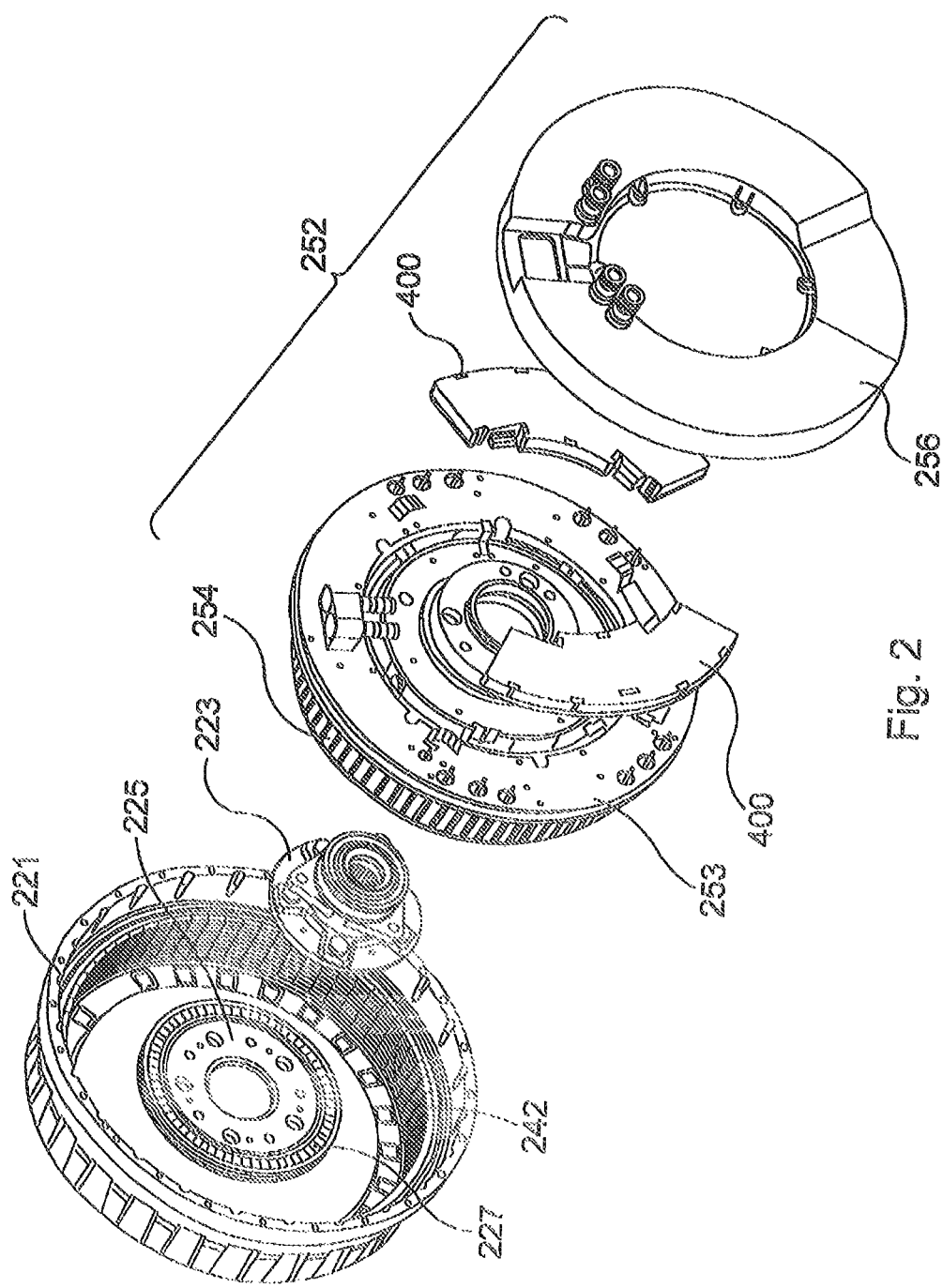
FIG. 2 illustrates an exploded view of a motor embodying the present invention.

For the purposes of the present embodiment, as illustrated in FIG. 2, the in-wheel electric motor includes a stator 252 comprising a circumferential support 253 that acts as a heat sink, multiple coils 254, two control devices (not shown) mounted on the circumferential support 253 on a rear portion of the stator for driving the coils, and an annular capacitor (not shown), otherwise known as a DC link capacitor, and a lead frame (not shown), described below, that is mounted between an axial edge of the coils and an axial flange formed on the circumferential support for coupling the control devices to the coils. The coils 254 are formed on stator tooth laminations to form coil windings. A stator cover 256 is mounted on the rear portion of the stator 252, enclosing the control devices and annular capacitor to form the stator 252, which may then be fixed to a vehicle and does not rotate relative to the vehicle during use.

Figure 3:
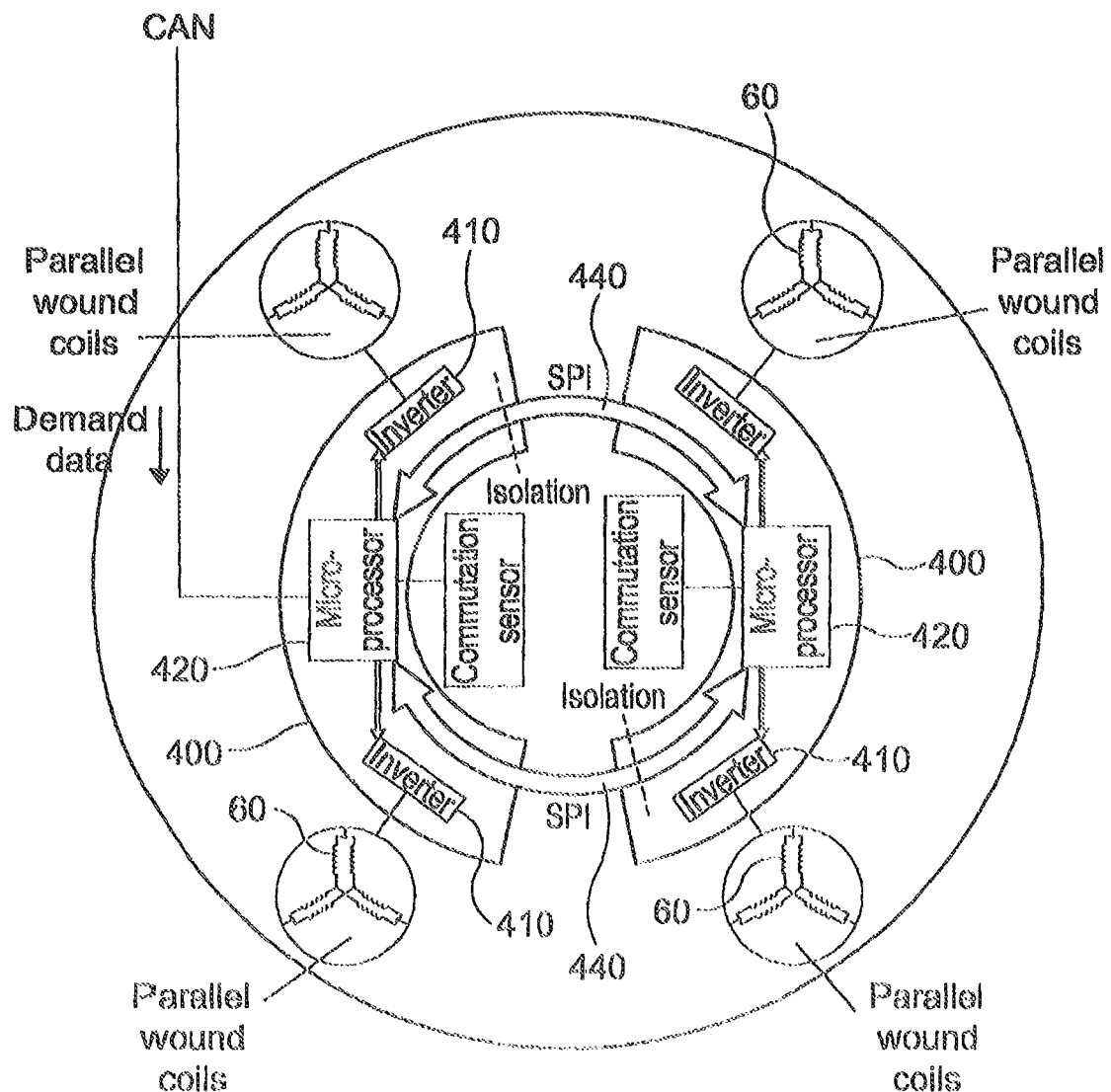
FIG. 3 illustrates a schematic representation of a control device.

As schematically represented in FIG. 3, each control device 400 includes an inverter 410 with one of the control devices including control logic 420, which in the present embodiment includes a processor, for controlling the operation of both inverters 410. Each inverter is coupled to three sets of coil windings, arranged electrically in parallel, to form a set of three sub motors, as described below.

The annular capacitor is coupled between the inverters 410 and the electric motor's DC power source for reducing voltage ripple on the electric motor's power supply line, otherwise known as the DC busbar, and for reducing voltage overshoots during operation of the electric motor. For reduced inductance the capacitor is preferably mounted adjacent to the control devices 400.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block (not shown). The bearing block can be a standard bearing block as would be used in a vehicle to which this motor assembly is to be fitted. The bearing block comprises two parts, a first part fixed to the stator and a second part fixed to the rotor. The bearing block is fixed to a central portion of the wall of the stator 252 and also to a central portion of the housing wall 220 of the rotor 240. The rotor 240 is thus rotationally fixed to the vehicle with which it is to be used via the bearing block at the central portion of the rotor 240. This has an advantage in that a wheel rim and tyre can then be fixed to the rotor 240 at the central portion using the normal wheel bolts to fix the wheel rim to the central portion of the rotor and consequently firmly onto the rotatable side of the bearing block. The wheel bolts may be fitted through the central portion of the rotor through into the bearing block itself. With both the rotor 240 and the wheel being mounted to the bearing block there is a one to one correspondence between the angle of rotation of the rotor and the wheel.

The rotor also includes a set of magnets (not shown) for position sensing, otherwise known as commutation magnets, which in conjunction with sensors mounted on the stator allows for a rotor flux angle to be estimated, which is used by the control devices to control current flow within the coils using space vector pulse width modulation, as described below. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor, where the AC voltage signal output by the Hall sensor can be used for both rotor position detection and for determining rotor velocity ($\omega$).

For improved position detection, preferably the sensor includes an associated second sensor placed 90 electrical degrees displaced from the first sensor.

In the present embodiment the electric motor includes six coil sets with each coil set having three coil sub-sets that are coupled in a wye configuration to form a three phase sub-motor, resulting in the motor having six three phase sub-motors, where as stated above the respective coils of the six coil sets are wound on individual stator teeth, which form part of the stator. The operation of the respective sub-motors is controlled via one of two control devices 300, as described below. Although the present embodiment describes an electric motor having six coil sets (i.e. six sub motors) the motor may equally have one or more coil sets with associated control devices. Equally, each coil set may have any number of coil sub-sets, thereby allowing each sub-motor to have two or more phases.

FIG. 3 illustrates the connections between the respective coil sets 60 and the control devices 400, where three coil sets 60 are connected to a respective three phase inverter 410 included on a control device 400. As is well known to a person skilled in the art, a three phase inverter contains six switches, where a three phase alternating voltage may be generated by the controlled operation of the six switches.

The six switches are configured as three parallel sets of two switches, where each pair of switches is placed in series and form a leg of the three phase bridge circuit.

However, the number of switches will depend upon the number of voltage phases to be applied to the respective sub motors, where the sub motors can be constructed to have any number of phases. Each control device 400 is arranged to communicate with the other control device 400 via a communication bus 440.

Preferably, the control devices 400 are of a modular construction. In a preferred embodiment each control device, otherwise known as a power module, includes a power printed circuit board on which is mounted a control printed circuit board, two power source busbars for connecting to a DC battery via the DC link capacitor, three phase winding busbars for connecting to respective coil windings via the lead frame, and a power substrate assembly, which includes an inverter.

The power printed circuit board includes a variety of other components that include drivers for the inverter switches formed on the power substrate assembly, where the drivers are used to convert control signals from the control printed circuit board into a suitable form for operating switches mounted on the power printed circuit board, however these components will not be discussed in any further detail.

One of the control devices 400 includes a processor 420 for controlling the operation of the inverter switches in both control devices 400. Additionally, each control device 400 includes an interface arrangement to allow communication between the respective control devices 400 via a communication bus 440 with one control device 400 being arranged to communicate with the control unit 102 mounted external to the electric motor.

The processor 420 in the respective control device 400 is arranged to control the operation of the inverter switches mounted within each control device 400 to allow each of the electric motor coil sets 60 to be supplied with a three phase voltage supply, thereby allowing the respective coil sub-sets to generate a rotating magnetic field. As stated above, although the present embodiment describes each coil set 60 as having three coil sub-sets, the present invention is not limited by this and it would be appreciated that each coil set 60 may have one or more coil sub-sets.

Under the control of the processor, each three phase bridge inverter 410 is arranged to provide PWM voltage control across the respective coil sub-sets, thereby generating a current flow in the respective coil sub-sets for providing a required torque by the respective sub-motors.

PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

For a given coil set 60 the three phase bridge inverter 310 switches are arranged to apply a single voltage phase across each of the coil sub-sets.

Using PWM switching, the plurality of switches are arranged to apply an alternating voltage across the respective coil sub-sets. The voltage envelope and phase angle of the electrical signals is determined by the modulating voltage pulses.

The inverter switches can include semiconductor devices such as MOSFETs or IGBTs. In the present example, the switches comprise IGBTs. However, any suitable known switching circuit can be employed for controlling the current.

The inverter 410 formed on the power assembly in one control device 400 is coupled to three coil sets, to form a first set of three sub motors, with the inverter 410 formed on the power assembly in the other control device 400 being coupled to the other coil sets, to form a second set of three sub motors.

Both inverters 410 are coupled to the respective coil sets via the lead frame, where each leg of the respective inverters is coupled to the lead frame via a respective phase winding busbar. For the purposes of the present embodiment, the different voltage phases generated by each inverter leg are designated W, V and U.

The coil windings are coupled to the lead frame, as described below, to allow current to flow from the DC power source via the respective inverters in the control devices to the coil windings to allow drive torque to be generated by the electric motor.

As discussed above, the processor is arranged to receive a torque demand from the control unit 102 via the CAN interface, however any form of communication link between the control unit 102 and the respective motor drive controller 80 can be used.

As each in-wheel electric motor is directly coupled to a wheel, this allows for the torque generated by the respective in wheel electric motors to be instantly applied to a wheel, where the generated torque at any given time is accurately known by the control circuitry within the control devices attached to the in-wheel electric motors. Accordingly, the in wheel electric motors provide the advantage of having both an extremely quick torque response and speed sensing loop.

The torque request will typically be initiated by either a user of the vehicle 100 indicating a desire to increase or decrease the acceleration of the vehicle, for example with the use of a throttle pedal, or via a vehicle control unit, which may be incorporated within the control unit 102, that automatically controls the speed/acceleration of the vehicle, such as an autonomous vehicle controller that provides a level of autonomous driving. The torque request is received by the control unit 102 and forwarded to the respective in wheel electric motors in the form of a torque demand command.

An embodiment for performing traction control utilizing the control unit 102 and the control devices mounted in each of the respective in wheel electric motors will now be described, where traction control is used to maximise the coefficient of friction between the vehicle and road surface during acceleration or braking of the vehicle by controlling the drive torque applied by the respective in wheel electric motors.

As is well known to a person skilled in the art, as a result of sliding between a tire of a vehicle and road when the vehicle accelerates or brakes, the observed angular velocity of the tire is different to the velocity of the vehicle. The difference in velocity is typically expressed as a percentage and is called 'slip ratio'. One equation used to determine slip ratio in the absence of vehicle yaw is:

$$S=(V_{vehicle}-r\omega)/V_{vehicle}$$

where $V_{vehicle}$ is the longitudinal velocity of the vehicle;
r is the wheel radius at the contact point;
ω is the angular velocity of the tire.

Although the above equation provides a slip ratio for a vehicle experiencing longitudinal acceleration or deceleration, it would be clear to a person skilled in the art that appropriate equations can also be used for determining a slip ratio for a vehicle experiencing a combination of longitudinal and lateral acceleration.

Figure 4:
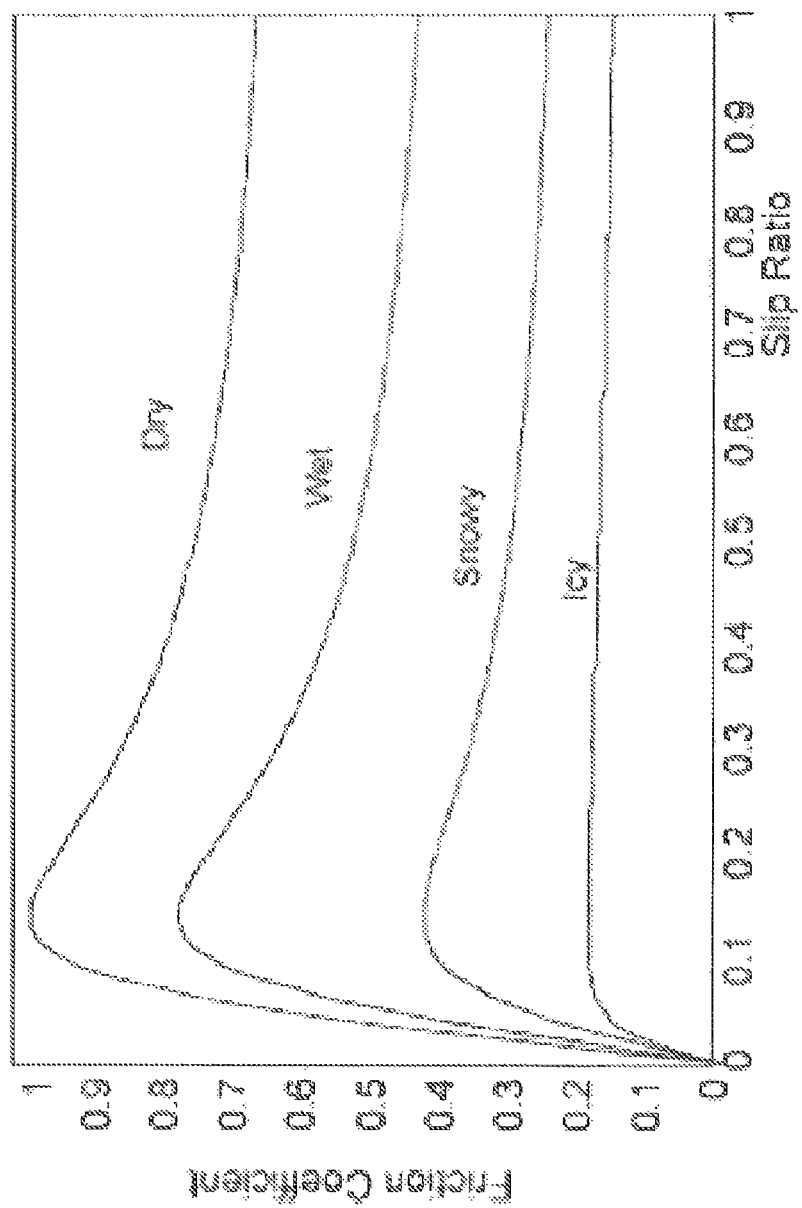
FIG. 4 illustrates a graph of slip ratios for different road conditions.

FIG. 4 illustrates a graph showing an example of variation of friction coefficient with respect to slip ratio for an accelerating vehicle for different road conditions. For an accelerating condition the slip ratio values that provide maximum friction coefficient between the tyre and the road surface provides for maximum torque transfer between the road and the vehicle. As shown in FIG. 4, above a certain slip ratio the friction coefficient between the road surface and the tyre drops dramatically, which can result in a wheel spin or wheel lock condition occurring. The aim of the described traction control system is to avoid this occurrence happening.

As part of its function within the traction control system, the control unit 102 is arranged to determine the speed of the vehicle. For example, the velocity of an un-driven wheel of the vehicle may be measure or GPS measurements may be used to determine the speed of the vehicle; however, any suitable means may be used.

To achieve optimum torque transfer between the road and the vehicle under both acceleration and braking the control unit 102 is configured to use the vehicle speed information to determine a maximum desired slip ratio limits for an accelerating condition for each wheel and a minimum desired slip ratio limits for a braking condition for each wheel.

For example, the control unit 102 can be arranged to map car speed to a maximum/minimum slip ratio, where the mapping function can be performed in any number of ways, such as via a table or use of an algorithm.

Knowing the speed of the vehicle and having a maximum and minimum desired slip ratio limit value, using the slip ratio equations above, the control unit 102 is arranged to calculate a maximum and minimum speed limit for each wheel driven by an in-wheel electric motor. In other words, for the given speed of the vehicle the maximum speed limit (i.e. for an accelerating condition) of the wheel will result in a sliding between the tire fitted to the wheel and road that would correspond to the maximum desired slip ratio, and the minimum speed limit (i.e. a braking condition) of the wheel will result in a sliding between the tire fitted to the wheel and road that would correspond to the minimum desired slip ratio. However, any suitable means for determining a maximum and minimum speed limit using the maximum and minimum desired slip limit values may be used.

The control unit 102 is arranged to communicate the torque demand request and the maximum and minimum speed limit values associated with each driven wheel to the respective in wheel electric motors, for example via the CAN bus.

Upon the respective in-wheel electric motors receiving the torque demand request, the in-wheel electric motors are arranged to control current flow within the coil winding to generate the requested torque demand, as discussed above, while monitoring the rotational speed of the rotor.

As a result of the higher mass of the vehicle compared to that of a wheel of the vehicle, typically the change in velocity of the vehicle will be relatively slow compared to that of the wheel in the situation where torque is being directly applied to the wheel, which causes the wheel to enter a slip condition.

Consequently, the update rate of the maximum and minimum speed limits for the vehicle, which are generated by the control unit 102, can be performed relatively slowly compared to the update rate required for torque control applied by the control device of the in wheel electric motors.

Consequently, the present invention provides the advantage of allowing a slow loop vehicle speed limit to be generated on a remote traction control unit, with a fast loop control torque limits being controlled directly at the vehicle wheels, via the in wheel electric motors.

If the control devices for each in wheel electric motor determines that the received torque demand request would result in the respective in wheel electric motors generating a torque that results in the rotational speed of the rotor for any of the in wheel electric motors exceeding a value corresponding to either the maximum or minimum speed limit, or a threshold value above the maximum or below the minimum speed limit, the control devices for the respective in wheel electric motor are arranged to prevent this occurring, even if this results in the torque generated by the respective in wheel electric motor being different from the torque demand value received from the control unit 102.

Consequently, if the torque demand received by the respective in wheel electric motors from the control unit 102 would result in the slip ratio for a wheel coupled to the respective in wheel electric motor exceeding a maximum or minimum slip limit, the control devices associated with the respective in wheel electric motors are arranged to limit the torque to a value less than the torque demand received from the control unit 102, thereby preventing the maximum or minimum slip limits being exceeded. Preferably, in this scenario the control devices associated with the respective in wheel electric motors are arranged to generate a drive torque that would result in a wheel velocity that corresponds substantially to the maximum or minimum wheel velocity.

The invention claimed is:

1. A traction control system for a vehicle having a first wheel driven by a first electric motor, wherein the first electric motor includes a first set of coil windings, the traction control system comprising:
    a first controller arranged to control current in the first set of coil windings for generating a drive torque for driving the first wheel; and
    a second controller arranged to determine a maximum wheel velocity based on a first slip ratio value for the first wheel and the vehicle velocity and a minimum wheel velocity based on a second slip ratio value for the first wheel and the vehicle velocity;
    wherein the second controller is arranged to communicate to the first controller the maximum wheel velocity and minimum wheel velocity values and a torque demand value corresponding to a drive torque for driving the first wheel;
    wherein the first controller is arranged to control current in the first set of coil windings to generate a drive torque based on the maximum wheel velocity, the minimum wheel velocity values and the torque demand value received from the second controller; and
    wherein the first controller is arranged to control current in the first set of coil windings to generate a drive torque that substantially corresponds to the torque demand value unless the first controller determines that the received torque demand value would result in the maximum wheel velocity being exceeded or unless the first controller determines that the torque demand value would result in the wheel going below the minimum wheel velocity.

2. The traction control system according to claim 1, wherein the first slip ratio value is a maximum desired slip ratio.

3. The traction control system according to claim 1, wherein the second slip ratio value is a minimum desired slip ratio.

4. The traction control system according to claim 1, wherein the torque demand value is derived from a user input or received from a third controller or generated by the second controller.

5. The traction control system according to claim 1, wherein upon a determination that the torque demand value would result in a maximum wheel velocity being exceeded the first controller is arranged to generate a drive torque that would not result in the maximum wheel velocity being exceeded by more than a threshold value.

6. The traction control system according to claim 1, wherein upon a determination that the torque demand value would result in the first wheel going below the minimum wheel velocity the first controller is arranged to generate a drive torque that would result in the first wheel not going below the minimum wheel velocity by more than a threshold value.

7. The traction control system according to claim 1, wherein the first controller is arranged to determine whether the torque demand value would result in the first wheel exceeding the maximum wheel velocity value, if the first controller determines that the torque demand value would result in the first wheel exceeding the maximum wheel velocity value the first controller is arranged to generate a drive torque that would result in a wheel velocity corresponding substantially to the maximum wheel velocity.

8. The traction control system according to claim 1, wherein the first controller is arranged to determine whether the torque demand value would result in the first wheel going below the minimum wheel velocity value, if the first controller determines that the torque demand value would result in the first wheel going below the minimum wheel velocity value the first controller is arranged to generate a drive torque that would result in a wheel velocity corresponding substantially to the minimum wheel velocity.

9. The traction control system according to claim 1, wherein the second controller includes means for receiving a velocity value for the vehicle.

10. The traction control system according to claim 9, wherein the means for receiving a velocity value is arranged to receive the velocity value for a second wheel of the vehicle that is not being driven by a drive torque.

11. The traction control system according to claim 1, wherein the first electric motor is a first in-wheel electric motor.

12. A method for performing traction control for a vehicle having a wheel driven by an electric motor, wherein the electric motor includes a first set of coil windings, the method comprising:

communicating from a second controller to a first controller maximum wheel velocity and minimum wheel velocity values and a torque demand value corresponding to a drive torque for driving the wheel;

wherein the second controller is arranged to determine a maximum wheel velocity based on a first slip ratio value for the wheel and the vehicle velocity and a minimum wheel velocity based on a second slip ratio value for the wheel and the vehicle velocity;

wherein the first controller is arranged to control current in the first set of coil windings to generate a drive torque based on the maximum wheel velocity, the minimum wheel velocity values and the torque demand value received from the second controller; and wherein the first controller is arranged to control current in the first set of coil windings to generate a drive torque that substantially corresponds to the torque demand value unless the first controller determines that the received torque demand value would result in the maximum wheel velocity being exceeded or unless the first controller determines that the torque demand value would result in the wheel going below the minimum wheel velocity.

* * * * *